US007007288B2

(12) United States Patent
Tabor et al.

(10) Patent No.: US 7,007,288 B2
(45) Date of Patent: Feb. 28, 2006

(54) RECORDING AND/OR REPRODUCING APPARATUS FOR OPTICAL RECORDING MEDIA

(75) Inventors: Günter Tabor, Villingen-Schwenningen (DE); Rolf Dupper, Villingen-Schwenningen (DE)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

(21) Appl. No.: 10/450,212

(22) PCT Filed: Dec. 12, 2001

(86) PCT No.: PCT/EP01/14609

§ 371 (c)(1),
(2), (4) Date: Jun. 11, 2003

(87) PCT Pub. No.: WO02/50825

PCT Pub. Date: Jun. 27, 2002

(65) Prior Publication Data

US 2005/0005281 A1    Jan. 6, 2005

(30) Foreign Application Priority Data

Dec. 20, 2000 (DE) .............................. 100 63 940

(51) Int. Cl.
*G11B 7/08*    (2006.01)
(52) U.S. Cl. .................................... 720/671
(58) Field of Classification Search ............... 720/671, 720/648; 369/71
See application file for complete search history.

(56) References Cited

U.S. PATENT DOCUMENTS

| 5,615,196 | A |   | 3/1997 | Kato ........................... 369/71 |
| 5,946,291 | A |   | 8/1999 | D'Alayer de Costemore D'Arc ... 369/292 |
| 5,995,467 | A | * | 11/1999 | Ohyama et al. .............. 369/71 |
| 6,141,311 | A |   | 10/2000 | Huang ...................... 369/77.1 |
| 6,487,158 | B1 | * | 11/2002 | Begley ....................... 720/680 |

FOREIGN PATENT DOCUMENTS

| DE | 4335157 |   | 4/1995 |
| EP | 535583 |   | 4/1993 |
| EP | 807934 |   | 11/1997 |
| JP | 56-022228 |   | 3/1981 |
| JP | 03203042 A | * | 9/1991 |
| JP | 05120711 A | * | 5/1993 |
| JP | 06274915 A | * | 9/1994 |
| JP | 2000021007 A | * | 1/2000 |

OTHER PUBLICATIONS

Patent Abstracts of Japan, vol. 005, No. 073, May 15, 1981 & JP 56-022228.
Search Report dated Jun. 6, 2002.

* cited by examiner

*Primary Examiner*—William J Klimowicz
(74) *Attorney, Agent, or Firm*—Joseph S. Tripoli; Harvey D. Fried; Patricia A. Verlangieri

(57) ABSTRACT

A protective cover for an objective of an optical head is proposed which can be moved between a position covering the objective and a position exposing the objective. In the position exposing the objective, the protective cover is positioned outside the plane between the optical head and an optical recording medium located opposite the optical head.

7 Claims, 5 Drawing Sheets

RECORDING AND/OR REPRODUCING APPARATUS FOR OPTICAL RECORDING MEDIA

This application claims the benefit, under 35 U.S.C. § 365 of International Application PCT/EP01/14609, filed Dec. 12, 2001, which was published in accordance with PCT Article 21(2) on Jun. 27, 2002 in English and which claims the benefit of German patent application No. 10063940.2, filed Dec. 20, 2000.

The present invention relates to a protective cover for an objective of an optical head of a recording and/or reproducing apparatus according to the precharacterizing clause of Claim 1, a recording and/or reproducing apparatus using such a protective cover and also the use of such a protective cover during the production and/or transport of an optical head.

The optical head, and in particular its objective, of a recording and/or reproducing apparatus for optical recording media are sensitive components which have to be protected during the production and during the transport of the optical head and even when installed in a recording and/or reproducing apparatus. In particular, in order to ensure their serviceability, protection against dust, fingerprints, mechanical damage and the like is required.

It is therefore known, for example, to provide the optical head during its fabrication and during its transport with a cover as illustrated by way of example in FIG. 5. The perspective view of FIG. 5 reveals an optical head 9 having a housing 4 and a (hidden) objective 7, the optical head 9 being provided with a protective cover 2, which is snapped onto the housing 4 of the optical head 9 in such a way that the objective 7 exposed through a corresponding opening (not illustrated) in the housing 4 of the optical head 9 is covered by the protective cover 2. The protective cover 2 is fitted by hand and, after the production and the transport of the optical head 9 and before its installation in a corresponding recording and/or reproducing apparatus, is removed by hand and disposed of. To some extent, during the production and during the transport of the optical head, even different protective covers are used. This known protective cover 2 therefore leads to generally undesired waste products and, in addition, does not ensure any protection of the objective after the optical head 9 has been installed in a recording and/or reproducing apparatus.

In order to ensure adequate protection even in the installed state of the optical head, for example EP-A1-045 537 has disclosed a recording and reproducing apparatus for optical recording media in which a plate which is transparent to radiation and covers the objective is fitted to the optical head, runs transversely with respect to the optical axis of the objective and is arranged between the objective and the optical recording medium. However, the optical properties of the objective have to be adapted in this case in order to compensate for the influence arising from the radiation-transparent plate. In addition, damage to the radiation-transparent plate is possible, which then in turn has a detrimental effect on the serviceability of the optical head in the same way as direct damage to the objective.

Furthermore, dust protection devices for an optical head are described in the two Japanese patent applications with the application numbers 62-90278 and 62-169023 from 1987. This dust protection is in each case achieved by means of a cover plate which, in non-real-playing operation of the recording and/or reproducing apparatus, that is to say during the non-use of the optical head, are pushed over the optical head and therefore over the objective by means of a lever and are held in this position.

Furthermore, DE-A1-43 35 157 discloses a protective cover for an optical head which, in addition to its protective function against contamination of the objective, also affects locking of the moveable objective in non-playing operation of a recording and/or reproducing apparatus. The protective cover is constructed in the form of a plate-like lever, which can be pivoted about an axis at its end facing away from the objective of the optical head, between a first position covering and mechanically locking the objective and a second position exposing the objective. In this case, the lever itself can also be locked in a position covering and mechanically locking the objective, while it is held in the other position, exposing the objective, by means of spring force.

The last-named protective covers are used to protect the objective of an optical head during non-operation of the recording and/or reproducing apparatus that is to say to protect the objective when the optical head is installed. During the fabrication and the transport of the optical head, separate protective covers are still required, which have to be removed and disposed of before the optical head is installed in a recording and/or reproducing apparatus. In addition, the plate-like protective covers are provided between the optical head and an optical recording medium, which may be disadvantageous in particular when there is restricted space in the recording and/or reproducing apparatus.

Starting from the aforementioned prior art, it is an object of the present invention to develop further a protective cover for an objective of an optical head, which can be used both when the optical head is installed and also during its manufacture and transport. In addition, the protective cover is also to be suitable for recording and reproducing apparatus which, during the operation of the apparatus, are able to provide only a small distance between the optical head and the optical recording medium.

According to a first aspect of the present invention, these objects are achieved by a protective cover having the features of Claim 1. Furthermore, according to a further aspect of the present invention, the above object is also achieved by a recording and/or reproducing apparatus having the features of Patent Claim 6. Preferred configurations and further developments of the invention are the subject of the subclaims.

The protective cover according to the invention for an objective of an optical head can be moved between a first position, covering the objective, and a second position, exposing the objective. In this case, the protective cover can be locked both in the position covering the objective of the optical head and in the position exposing the objective, so that the protective cover can be used not only when the optical head is installed but also during the production and transport of the latter. In addition, in the position exposing the objective, the protective cover is positioned outside the plane between the optical head and an optical recording medium located opposite the optical head. This measure permits the use of the protective cover according to the invention even in recording and/or reproducing apparatus whose space is limited, in particular between optical head and optical recording medium.

The protective cover is preferably fitted permanently to the optical head and can be pivoted or rotated between the position covering the objective and position exposing the objective about an axis which runs approximately perpendicular to the optical axis of the objective.

In a recording and/or reproducing apparatus using the above protective cover, during the process of inserting or removing an optical recording medium into or from the apparatus, the protective cover is advantageously in the position covering the objective of the optical head, while it is otherwise positioned in the position exposing the objective. In this case, it is particularly advantageous if the recording and/or reproducing apparatus has a drawer for the insertion and removal of an optical recording medium into and from the recording and/or reproducing apparatus, and if a mechanism is provided which, when the drawer is opened, has the effect, of automatically moving the protective cover into the position covering the objective of the optical head and, when the drawer is closed, has the effect of automatically moving the protective cover into the position exposing the objective.

However, in an alternative embodiment of a recording and/or reproducing apparatus, the protective cover according to the invention can likewise be in the position covering the objective of the optical head during the entire non-use phase and positioned in the position exposing the objective only during the use of the optical head.

As already mentioned above, the protective cover according to the invention for protecting an objective of an optical head can preferably also be used during the production and/or the transport of the optical head. In this case, the protective cover is advantageously moved by hand from the position exposing objective of the optical head into the position closing the objective of the optical head.

A preferred exemplary embodiment of the present invention will now be explained in more detail below, using the appended drawing, in which.

Figure 1:
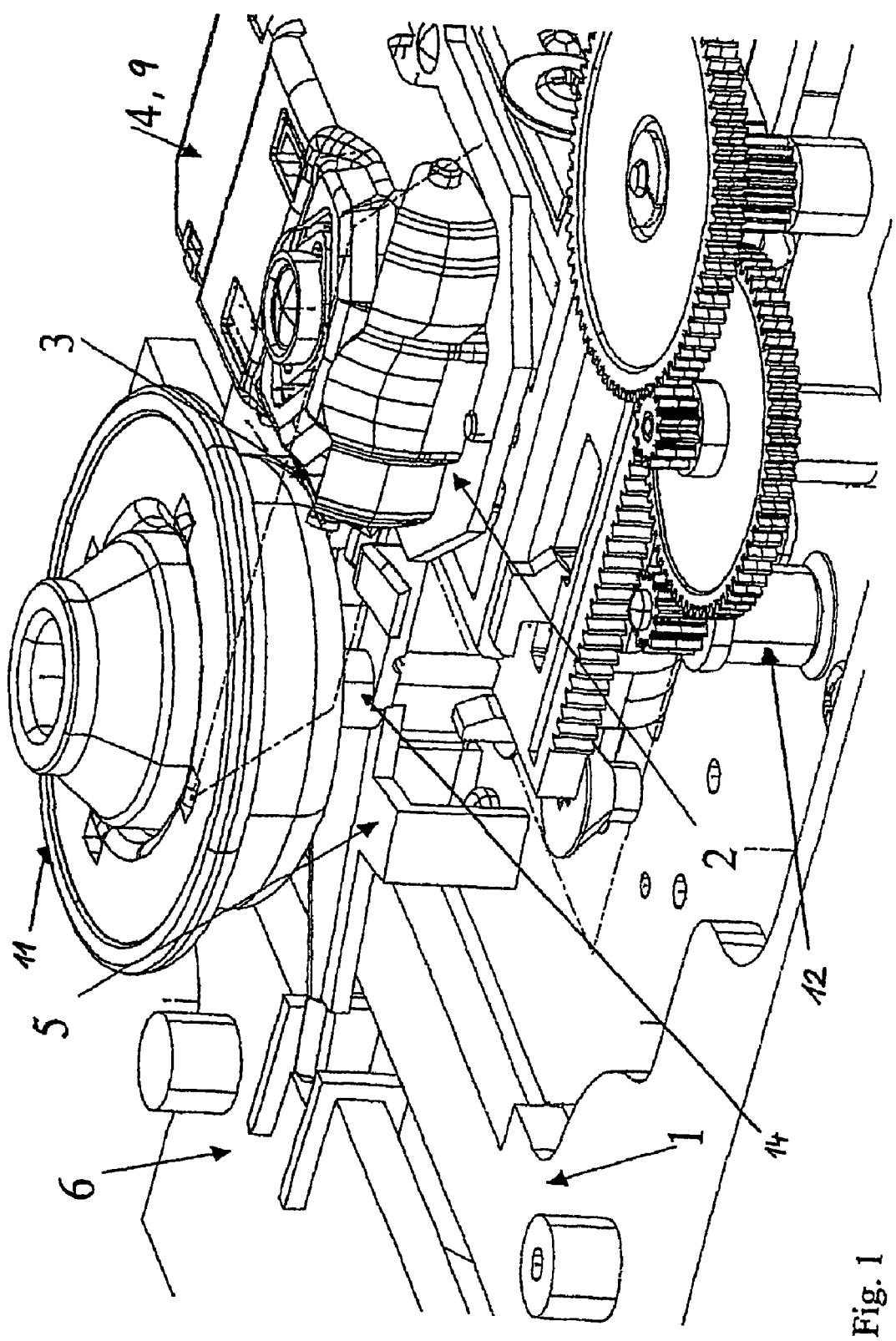
FIG. 1 shows, in an extract and in a perspective representation, an exemplary embodiment of a recording and/or reproducing apparatus having a protective cover for an objective according to the present invention, the protective cover being illustrated in the position exposing the objective.
Figure 2:
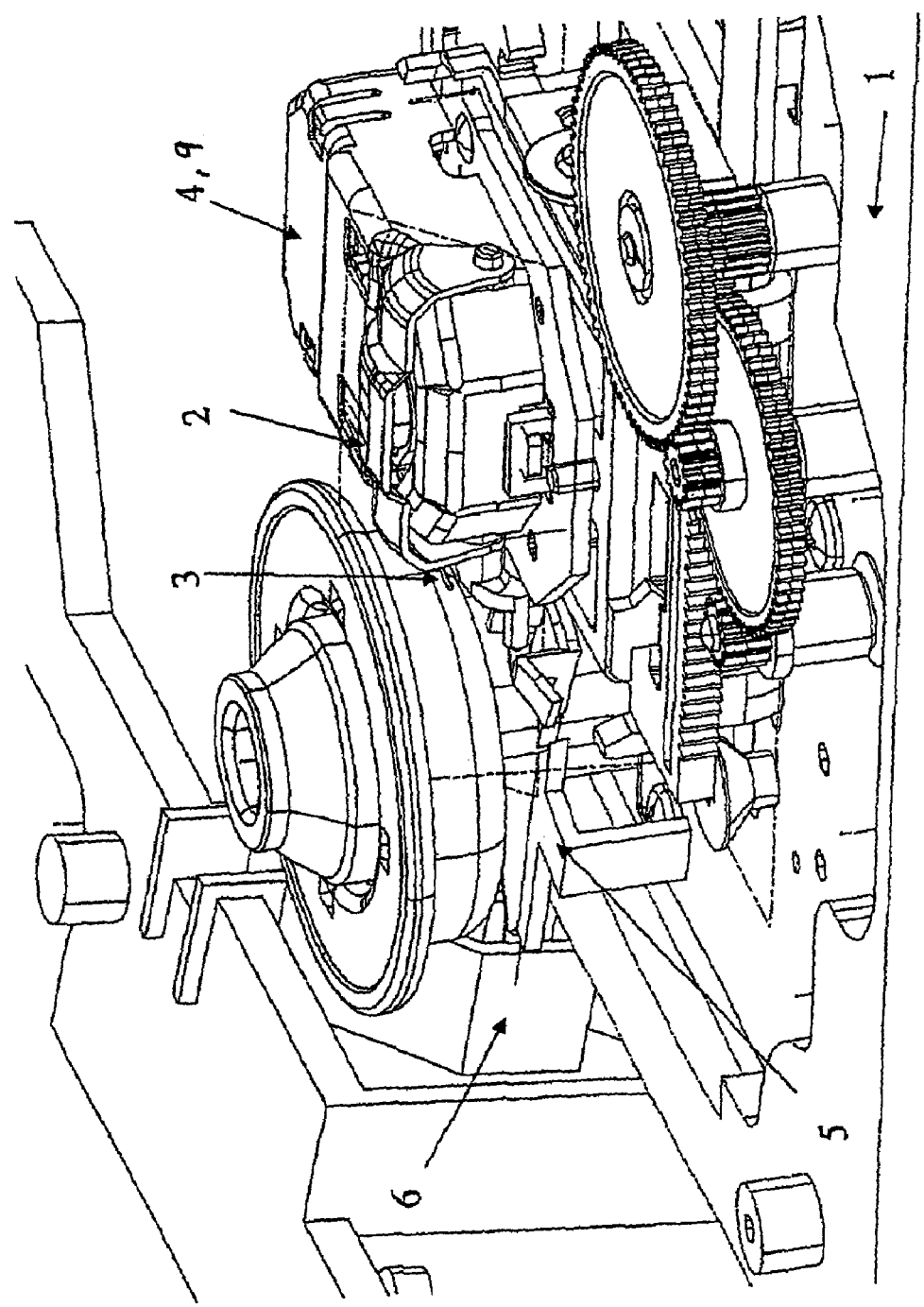
FIG. 2 shows, in an extract and in a perspective representation, the recording and/or reproducing apparatus of FIG. 1, the protective cover being illustrated in the position covering the objective.
Figure 3:
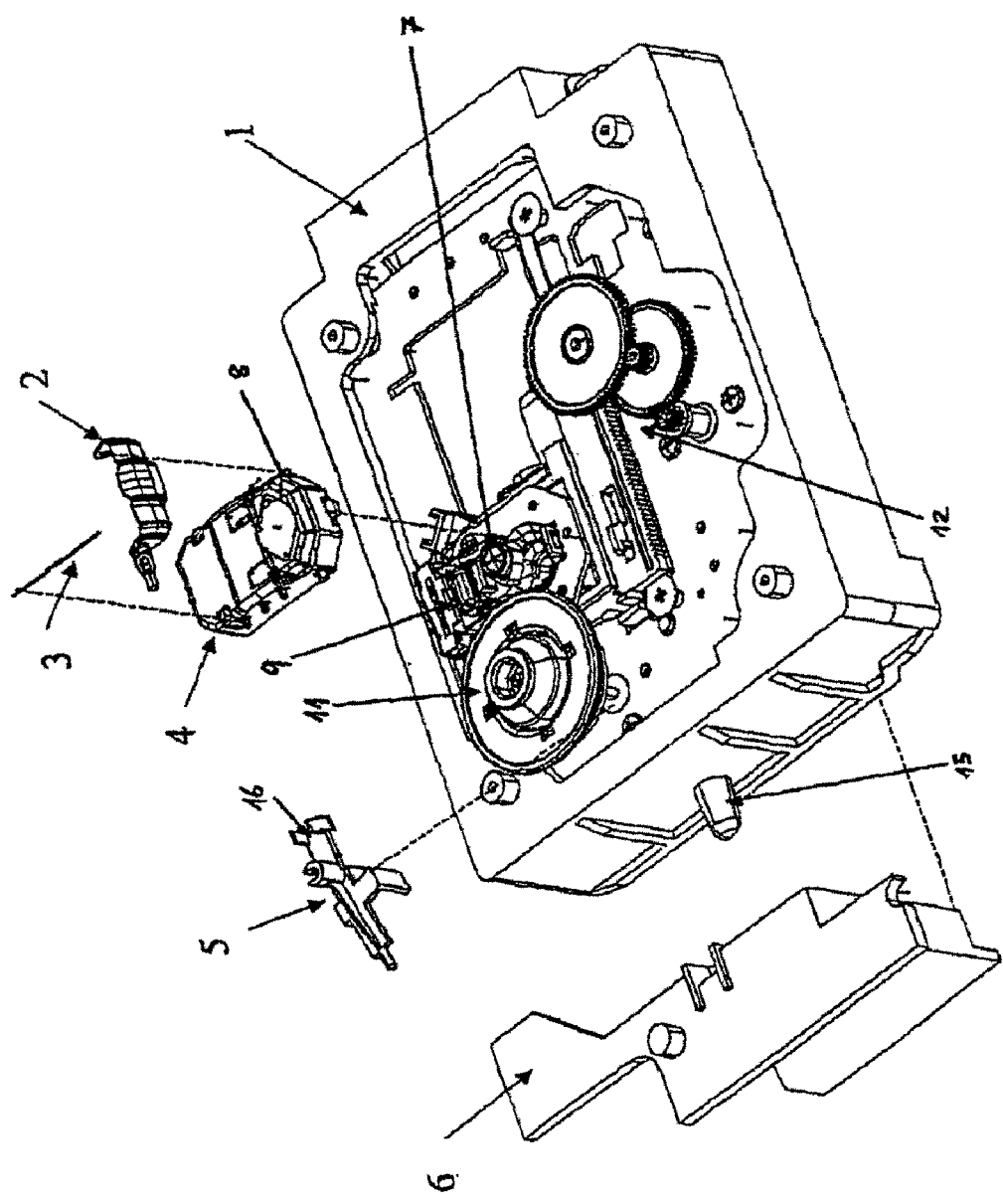
FIG. 3 shows a perspective exploded illustration of the essential components of the recording and/or reproducing apparatus of FIG. 1.

FIGS. 1 to 3 show extracts from a recording and/or reproducing apparatus for recording and/or reproducing information on and respectively from an optical recording medium, such as a CD, CD-ROM or the like. In the housing (not illustrated) of the recording and/or reproducing apparatus there is a drive plate 1, on which the various mechanical and electronic components for the recording and/or reproduction of information on and respectively from an optical recording medium are arranged.

Figure 4A:
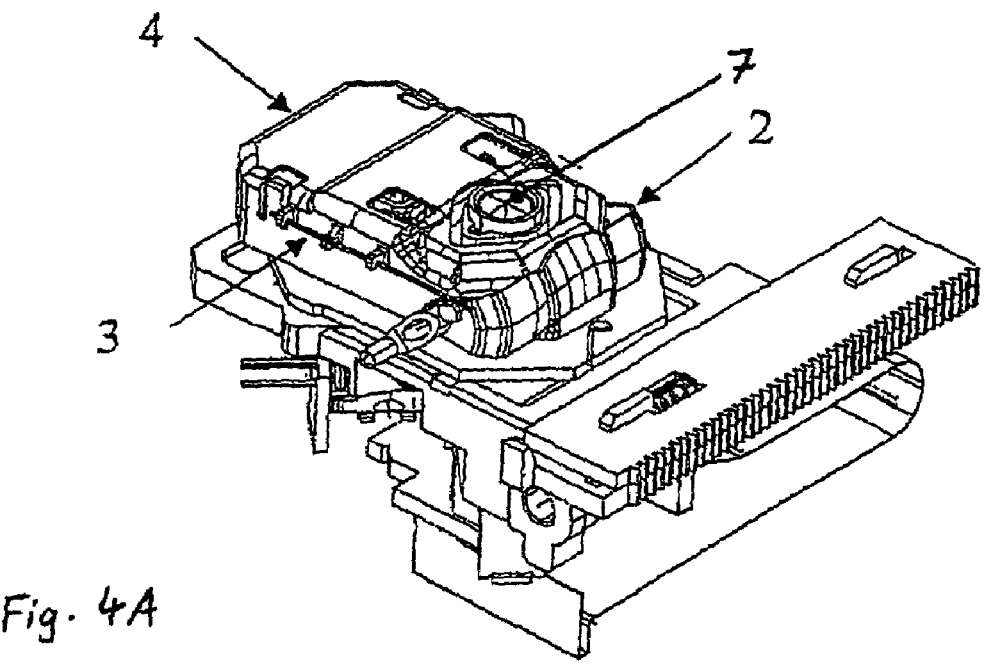
FIGS. 4A and 4B show, in a perspective enlarged representation, the optical head with protective cover of the recording and/or reproducing apparatus of FIG. 1, with the protective cover in the position exposing and covering the objective, respectively.
Figure 4B:
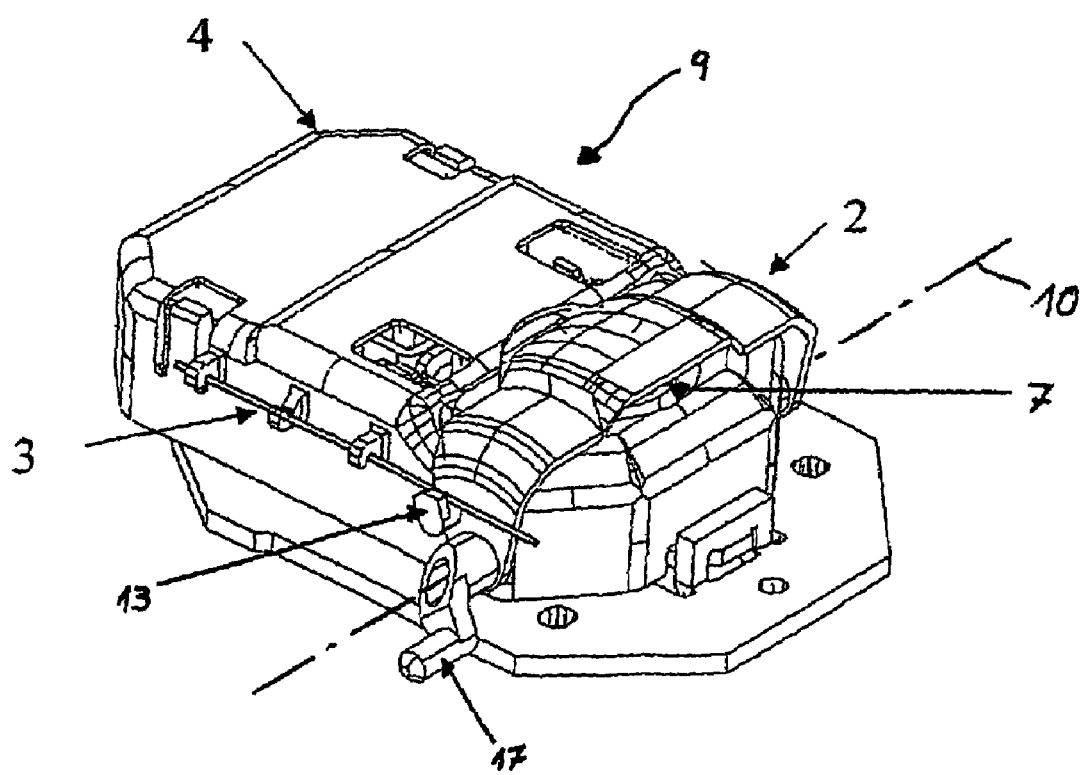
Figure 5:
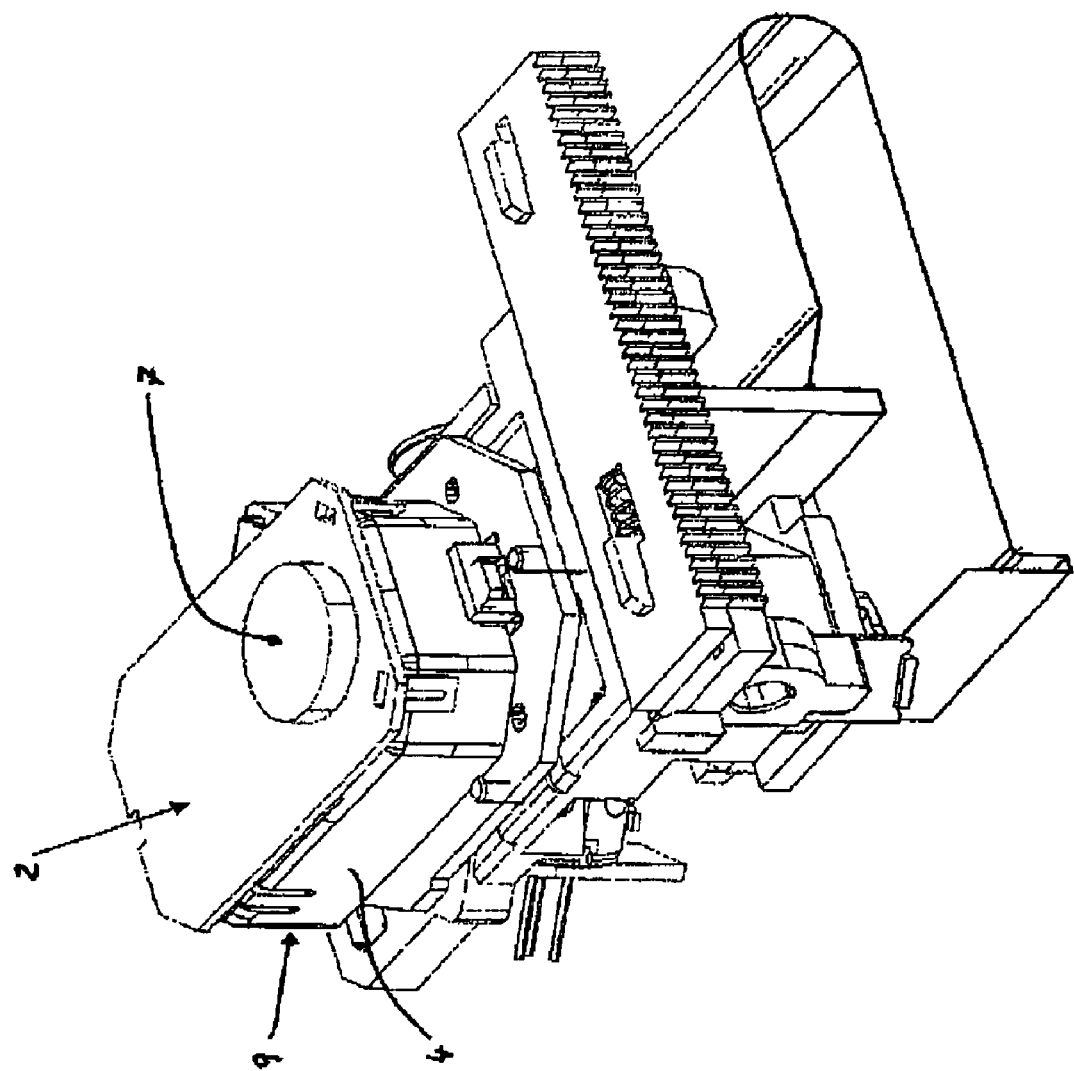
FIG. 5 shows, in a perspective representation, an optical head having a protective cover according to the prior art.

Shown in particular in FIGS. 1 to 3 is a turntable 11 for holding an optical recording medium which, by means of a suitable drive mechanism (not illustrated) can be driven in rotation via an axis of rotation 14. Also provided on the drive plate 1 is an optical head 9 which is arranged in an appropriate housing 4 and, in FIGS. 4A and 4B, is shown on its own, and in particular has an objective or lens system 7. The objective 7 is used to aim a light beam at the optical recording medium and to receive a light beam reflected from the optical recording medium. To this end, the objective 7 projects through and out of a corresponding opening 8 in the housing 4 of the optical head 9, the said opening facing the optical recording medium with a predetermined spacing between them. In order to write and read information to and from the optical recording medium, the optical head 9 can be moved in a plane parallel to the optical recording medium and in the radial direction of the optical recording medium, in a predetermined write/read area, by means of a drive device 12, which is likewise fitted to the drive plate 1.

The optical head 9 is provided with a protective cover 2, which can be moved between a first position and a second position, as can be seen in FIGS. 1 and 2 and FIGS. 4A and 4B. In the first position (FIGS. 2 and 4B), the protective cover 2 is positioned over the opening 8 in the housing 4 of the optical head 9 and covers the objective 7, in order to protect the latter against dust, contamination, mechanical damage and the like. In the second position (FIGS. 1 and 4A), the protective cover 2 exposes the opening 8 of the optical head 9 and therefore the objective 7.

In the exemplary embodiment of the invention shown in FIGS. 1 to 4, the protective cover 2 is connected permanently to the optical head 9 and can be pivoted through about 90° about an axis 10 which runs perpendicular to the optical axis of the objective 7. In the second position, exposing the objective 7, the protective cover 2 is pivoted completely out of the interspace between the optical head 9 and the optical recording medium, so that this interspace can be kept small if required.

In order to protect the objective 7 additionally, on its inner side facing the objective 7 in the first position, in the area of the objective 7, the objective 7 can be provided with an additionally protective medium, for example a felt or the like.

The protective cover 2 can be locked both in the first position covering the objective 7 and in its second position exposing the objective 7. In the exemplary embodiment shown here, this locking is carried out by a means of a spring wire 3 provided on the optical head 9 and a corresponding mating element 13 provided on the protective cover 2. The mating element 13 of the protective cover 2 is designed in such a way that the spring wire, which is in engagement with the mating element 13, can hold and firmly clamp the mating element 13 and therefore the protective cover 2 in two stable positions, as shown in FIGS. 4A and 4B. Here, the holder is selected in such a way that it can nevertheless be overcome with little expenditure of force in order to move or to pivot the protective cover 2 from the one to the other position.

The protective cover 2 according to the invention for the objective 7 of the optical head 9 can be used both during the production and the transport of the optical head 9 and also when the optical head 9 is installed in a recording and/or reproducing apparatus. Therefore, only one component is necessary to protect the objective 7 at every stage. The protective cover 7 additionally remains on the housing 4 of the optical head 9, so that the waste material arising in the case of earlier apparatus can also be reduced.

During the production process and during the transport of the optical head 9, the protective cover 2 is moved in a simple way by hand into the position covering the objective. In this position, the protective cover 2 is held securely by means of the spring element in the form of the spring wire 3.

When the optical head 9 is installed in a recording and/or reproducing apparatus, the objective 7 is to be protected, in particular, during the insertion or removal of an optical recording medium into or from the recording and/or reproducing apparatus, since during this time the apparatus is open and dust can penetrate into the apparatus, can be deposited on the objective and impair its serviceability.

For this purpose, in order to insert or remove an optical recording medium into or from the recording and/or reproducing apparatus in the usual way, the drive plate 1 in the apparatus is lowered and, at the same time, a drawer or the like for holding an optical recording medium is moved out of the apparatus. The drive plate 1 is lowered, for example with the aid of a cam slider 6, which is arranged besides the drive plate 1 and which is in engagement with a corresponding cam 15 on the drive plate 1. The lowering operation of the drive plate 1 simultaneously has the effect that the protective cover 2 is automatically moved from its position exposing the objective 7 into its position covering the objective 7, as described below.

In addition, a lever element 5, which is permanently connected to the drive plate 1, is in engagement with the cam slider 6 for lowering the drive plate 1. The lever element 5 is preferably mounted such that it can rotate about the axis of rotation of the turntable 11, and assumes a second rotational position in the rest position of the drive plate 1 and a first rotational position when the drive plate 1 is lowered. That end of the lever element 5 which faces away from the cam slider 6 is operatively connected to the protective cover 2 of the optical head 9. For this purpose, for example a guide 16 provided at the end of the lever element 5 is in engagement with a corresponding lever arm 17 on the protective cover 2.

In the rest position of the drive plate 1, the lever element 5 is in its second rotational position (see FIG. 1), and the protective cover 2 assumes its second position, exposing the objective 7 (see FIG. 4A). If, then, in order to insert or remove an optical recording medium into or from the recording and/or reproducing apparatus, an appropriate drawer is moved out of the apparatus, then at the same time the drive plate 1 is lowered in a known manner by the cam slider 6. As a result of this lowering movement of the drive plate 1, the lever element 5 rotates automatically about the axis of rotation 14 of the turntable 11 into its first rotational position. This rotation of the lever element 5 simultaneously has the effect, as a result of the coupling 16, 17 of the lever element 5 with the protective cover 2, of rotation of the protective cover 2 about the axis 10 into its position covering the objective 7. If the drawer is moved into the apparatus again, then the raising of the drive plate 1, rotation of the lever element 5 into its second rotational position and rotation of the protective cover 2 into the second position, exposing the objective 7, takes place in an appropriately converse manner.

By means of the construction described above and the corresponding functioning of the protective cover 2 and the elements connected to it, it is ensured in a straightforward way that, when the recording and/or reproducing apparatus is opened in order to insert or remove an optical recording medium into or from the apparatus, the objective 7 of the optical head 9 is protected. In addition, by means of the same protective cover 2, it is also made possible to protect the objective 7 during the production and transport of the optical head.

The invention has been explained in detail above using a preferred exemplary embodiment. However, it goes without saying that various modifications of the protective cover or of the recording and/or reproducing apparatus can be found by those skilled in the art, without departing from the protective scope of the present invention, as it is defined by the enclosed claims.

For example, the mechanism which effects the rotation of the protective cover from one to the other position when the drawer of the recording and/or reproducing apparatus is opened/closed, is not restricted to the lever element described above. It is likewise possible for other configurations of levers to be provided. Furthermore, it is in particular also possible to operate the protective cover by an electric motor.

While the protective cover in the exemplary embodiment described above is moved from its one to the other position by means of a rotational or pivoting function, other mechanisms, such as sliding or displacement functions or combinations of the aforementioned possibilities, are also conceivable for this purpose.

The protective cover can both be fitted permanently to the optical head, as described above, and also detachably connected to the optical head. In this case, the pivot or the axis of rotation of the protective cover can also be positioned at other locations on the optical head or else on other components of the recording and/or reproducing apparatus.

Likewise, locking the protective cover in its two predefined end positions is not restricted to the combination described above of spring wire and corresponding mating element. This configuration of a spring element merely constitutes a particularly simple and cost-effective possible way of locking the protective cover.

The protective cover is preferably used, as described above, both during the production and transport of the optical head and when the optical head is installed. In principle, however, it is also possible to restrict the use of the protective cover according to the invention to the production process and the transport of the optical head. In order to avoid unnecessary waste products, however, the protective cover remains on the optical head even in this case, without disrupting the function of the optical head in the installed state.

While the protective cover in the exemplary embodiment described above covers the objective only while a drawer belonging to the recording and/or reproducing apparatus is open, it is likewise possible to use the protective cover to cover the objective of the optical head during every phase of non-use of the optical head. This ensures still more extensive protection of the objective against dust and other contaminants.

What is claimed is:

1. Protective cover for an objective of an optical head, it being possible for the protective cover to be moved between a first position, covering the objective, and a second position, exposing the objective,
    wherein the protective cover is connected permanently to the optical head and can be locked both in the position covering the objective of the optical head and in the position exposing the objective by means of a spring element, the protective cover is positioned outside a plane between the optical head and an optical recording medium located opposite the optical head in the position exposing the objective and the protective cover can be pivoted between the first and the second position, about an axis which runs approximately perpendicular to the optical axis of the objective.

2. Protective cover according to claim 1, wherein the spring element is a spring wire, which engages in a corresponding mating element fitted to the protective cover and clamps the said mating element firmly in two stable positions, which correspond to the two positions of the protective cover.

3. Recording and/or reproducing apparatus for an optical recording medium, having a housing, a turntable to hold an optical recording medium, a first drive device for the rotational drive of the turntable, an optical head with an objective to aim a light beam at the optical recording medium and to receive a light beam reflected from the optical recording medium, a second drive device for moving the optical head in a plane parallel to the optical recording medium in a write/read area of the optical head, comprising a protective cover according to claim 1 to protect the objective of the optical head.

4. Recording and/or reproducing apparatus according to claim 3, wherein the protective cover is located in the first position, covering the objective of the optical head during an insertion or removal operation of an optical recording medium into and from the recording and/or reproducing apparatus, while the protective cover is otherwise positioned in the second position, exposing the objective.

5. Recording and/or reproducing apparatus according to claim 4, wherein the recording and/or reproducing apparatus has a drawer for the insertion and removal of an optical recording medium into or from the recording and/or reproducing apparatus, and in that a mechanism is provided which, when the drawer is being opened has the effect of moving the protective cover into the position covering the objective of the optical head and, when the drawer is being closed, has the effect of moving the protective cover into the position exposing the objective of the optical head.

6. Recording and/or reproducing apparatus according to claim 5, wherein the mechanism has a lever, which is provided on a drive plate and is connected to the protective cover, the drive plate being lowered into the housing of the recording and/or reproducing apparatus when the drawer is opened, which has the effect of moving the lever for moving the protective cover into the position closing the objective of the optical head, and being raised when the drawer is closed, which has the effect of moving the lever for moving the protective cover into the position exposing the objective of the optical head.

7. Recording and/or reproducing apparatus according to claim 3, wherein the protective cover is in the first position, covering the objective of the optical head during the non-use of the optical head, while the protective cover is otherwise positioned in the second position, exposing the objective.

* * * * *